Aug. 7, 1934.   M. H. ACKERMAN   1,968,813
APPARATUS FOR STORING AND DISPENSING PRODUCTS
Filed Jan. 3, 1933   7 Sheets-Sheet 1
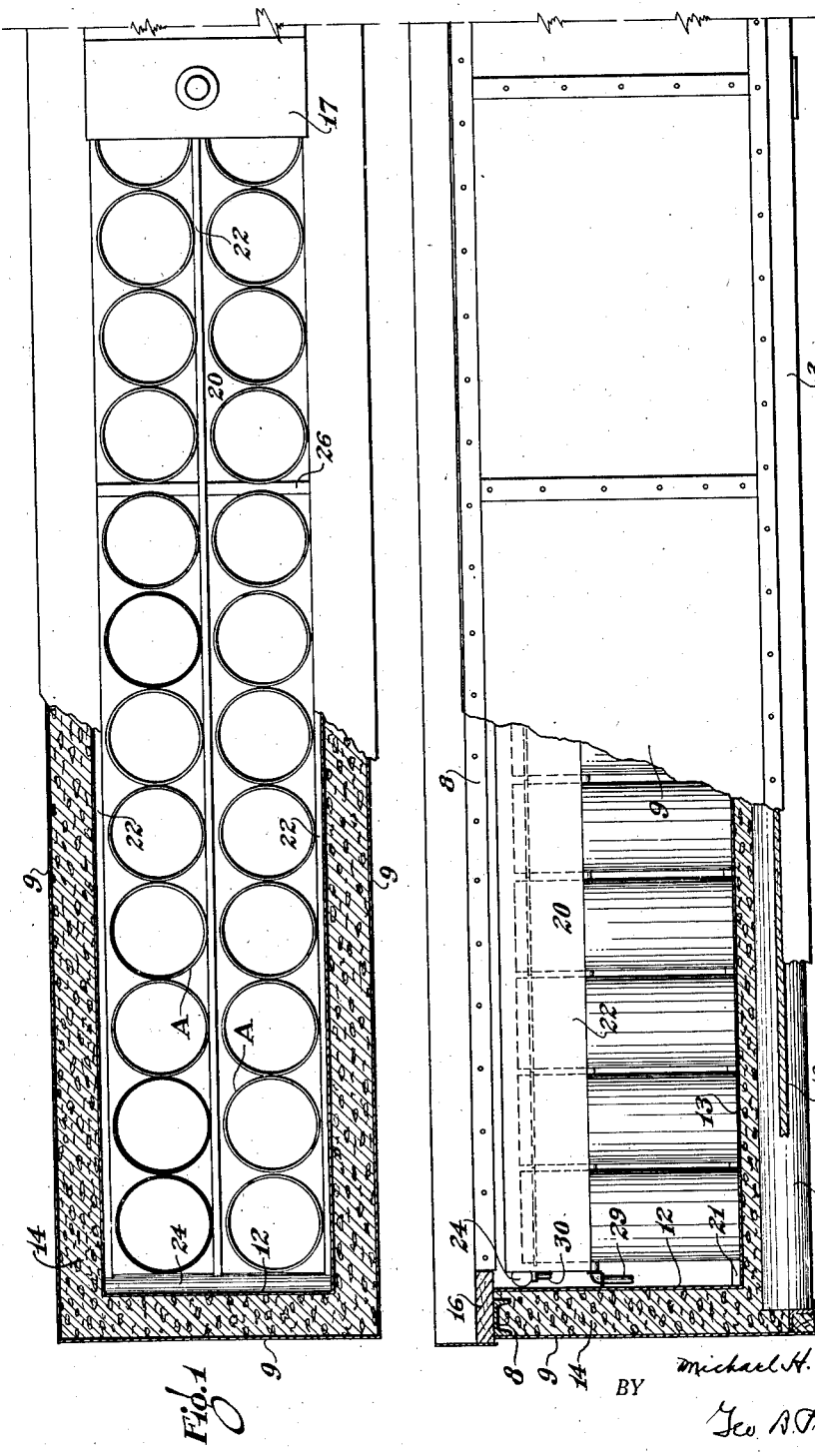
INVENTOR.
Michael H. Ackerman
BY
Geo. A. Pitts
ATTORNEY.

Aug. 7, 1934.　　　　　M. H. ACKERMAN　　　　　1,968,813
APPARATUS FOR STORING AND DISPENSING PRODUCTS
Filed Jan. 3, 1933　　　7 Sheets-Sheet 2
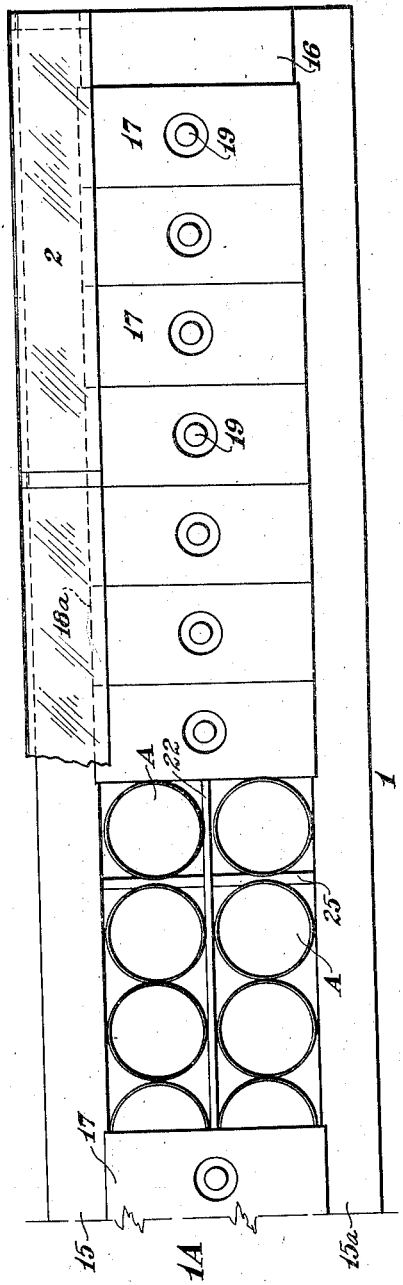
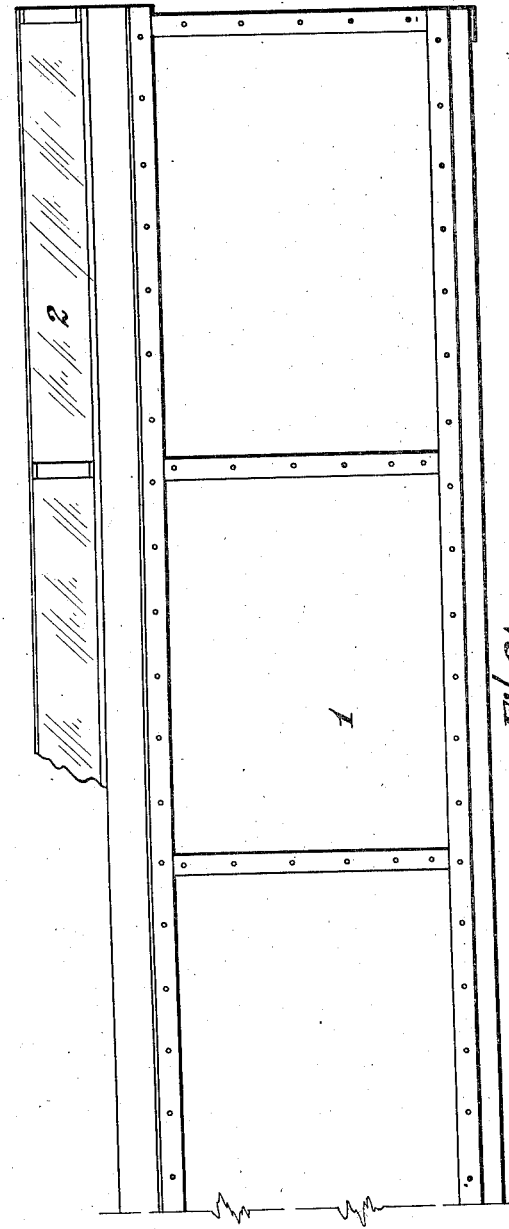
INVENTOR.
Michael H. Ackerman
BY
ATTORNEY.

Aug. 7, 1934.  M. H. ACKERMAN  1,968,813
APPARATUS FOR STORING AND DISPENSING PRODUCTS
Filed Jan. 3, 1933  7 Sheets-Sheet 3

INVENTOR.
Michael H. Ackerman
BY Geo. B. Pitts
ATTORNEY.

Aug. 7, 1934.     M. H. ACKERMAN     1,968,813
APPARATUS FOR STORING AND DISPENSING PRODUCTS
Filed Jan. 3, 1933     7 Sheets-Sheet 4
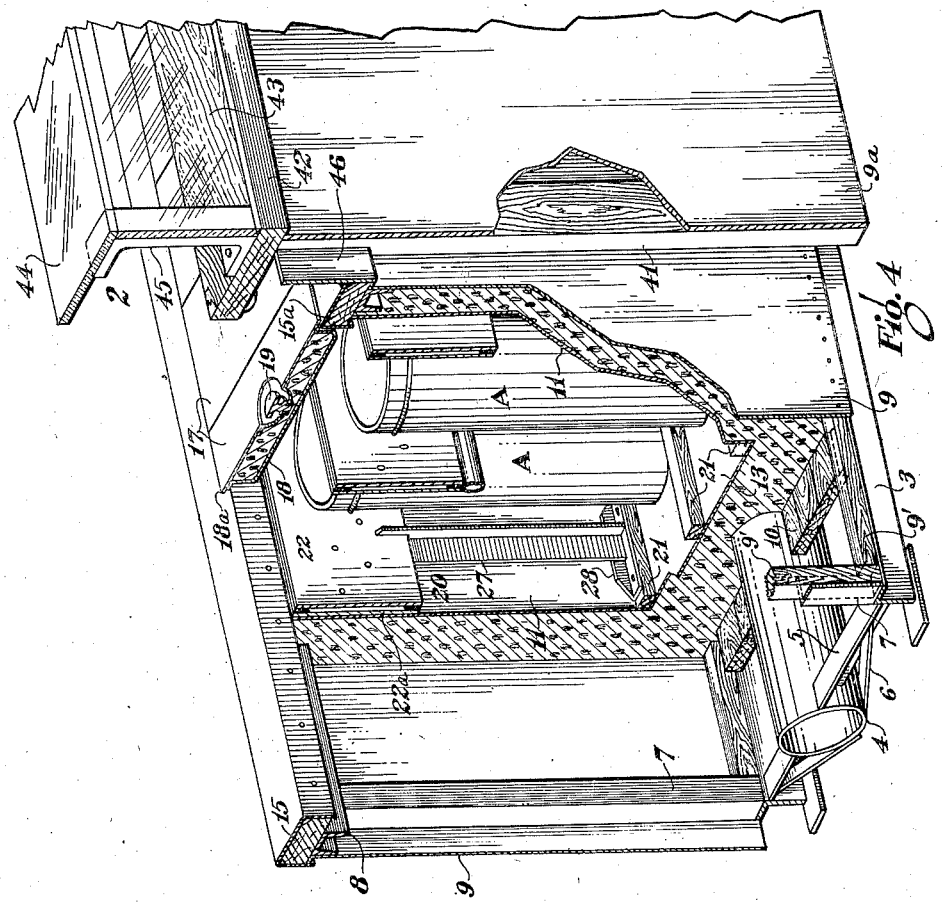
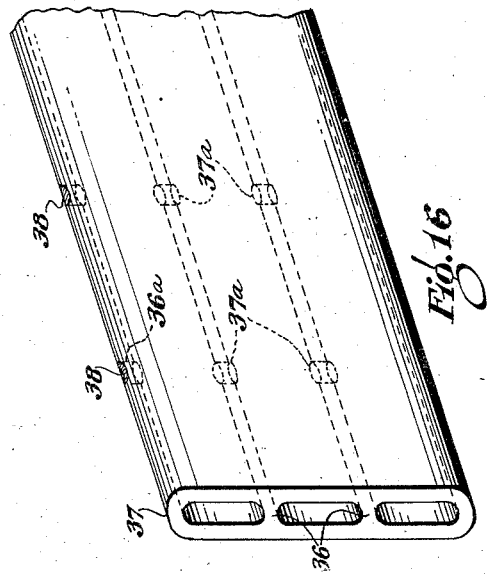
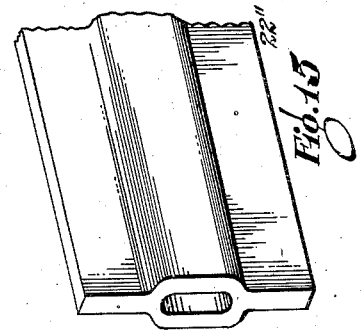
INVENTOR.
Michael H. Ackerman
BY
Geo. B. Pitts
ATTORNEY.

Aug. 7, 1934.   M. H. ACKERMAN   1,968,813
APPARATUS FOR STORING AND DISPENSING PRODUCTS
Filed Jan. 3, 1933   7 Sheets-Sheet 5
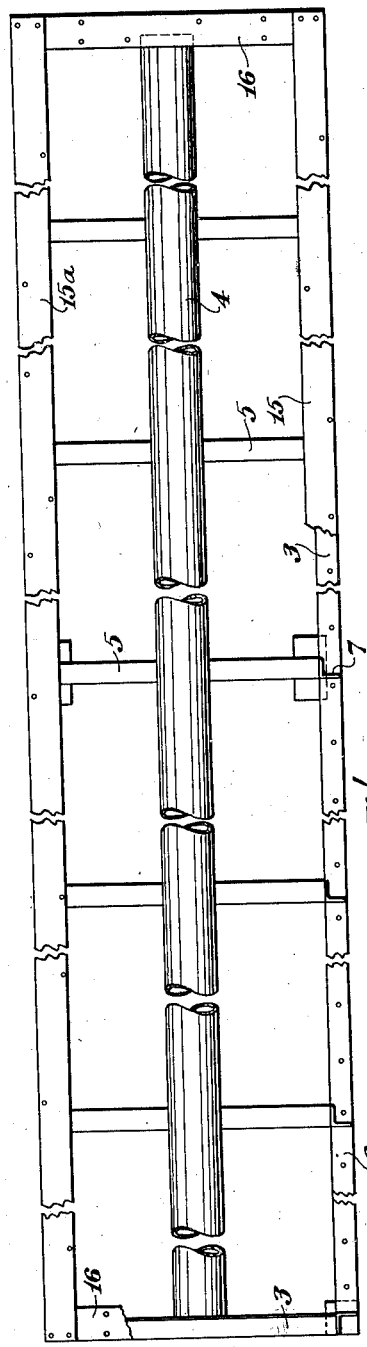
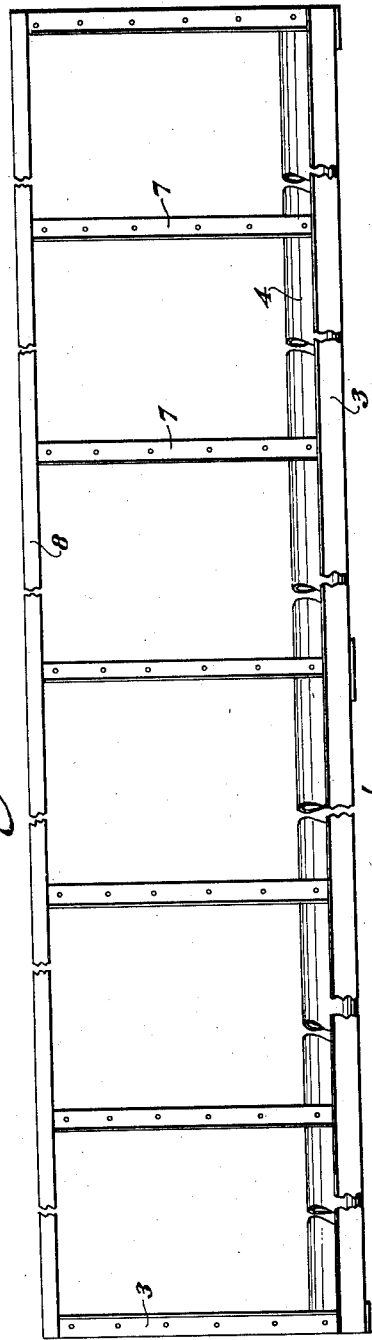
INVENTOR.
Michael H. Ackerman
BY
ATTORNEY.

Aug. 7, 1934.  M. H. ACKERMAN  1,968,813
APPARATUS FOR STORING AND DISPENSING PRODUCTS
Filed Jan. 3, 1933  7 Sheets-Sheet 6
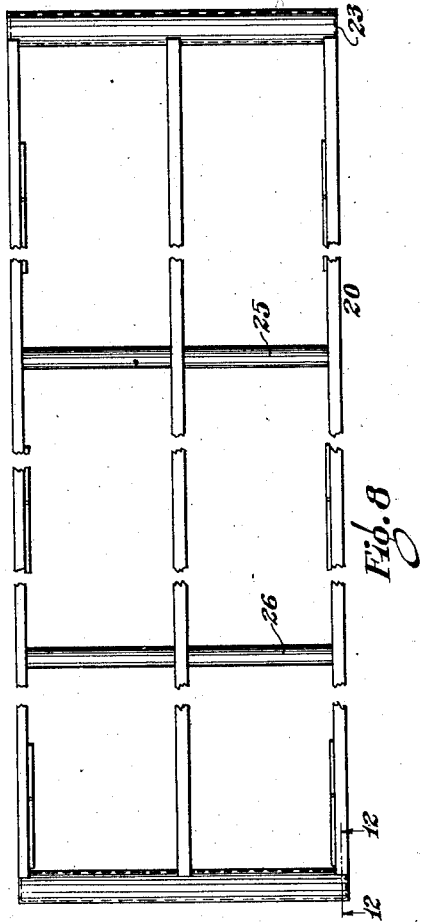
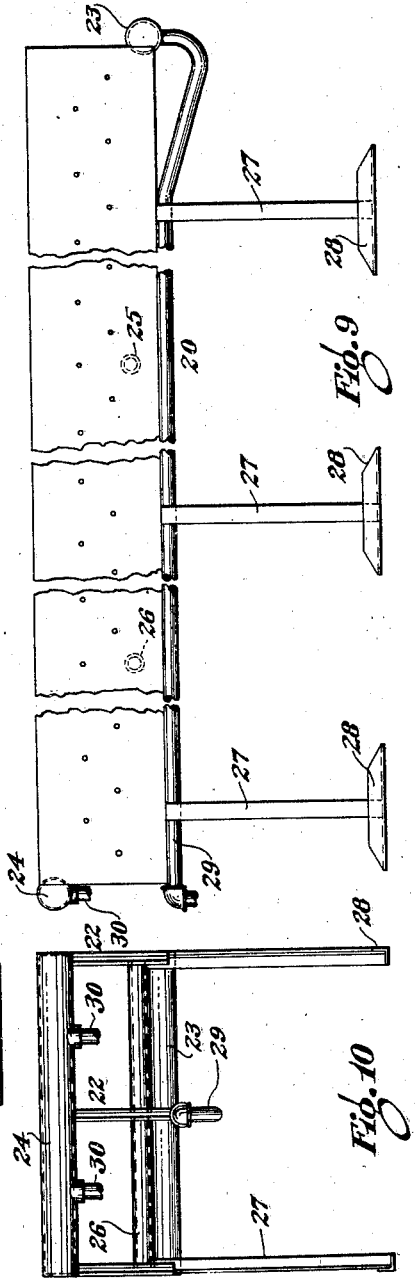
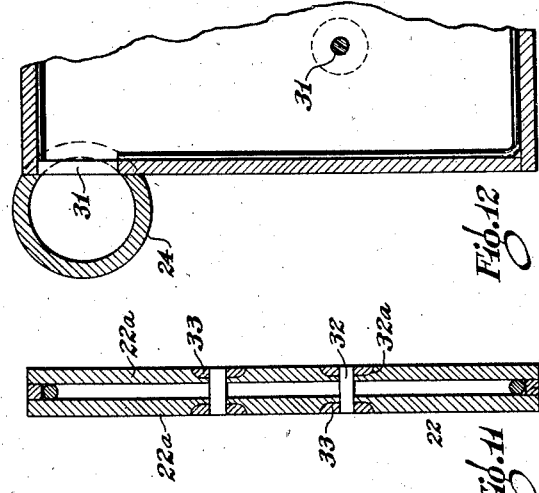
INVENTOR.
Michael H. Ackerman
BY
Geo. A. Pitts
ATTORNEY.

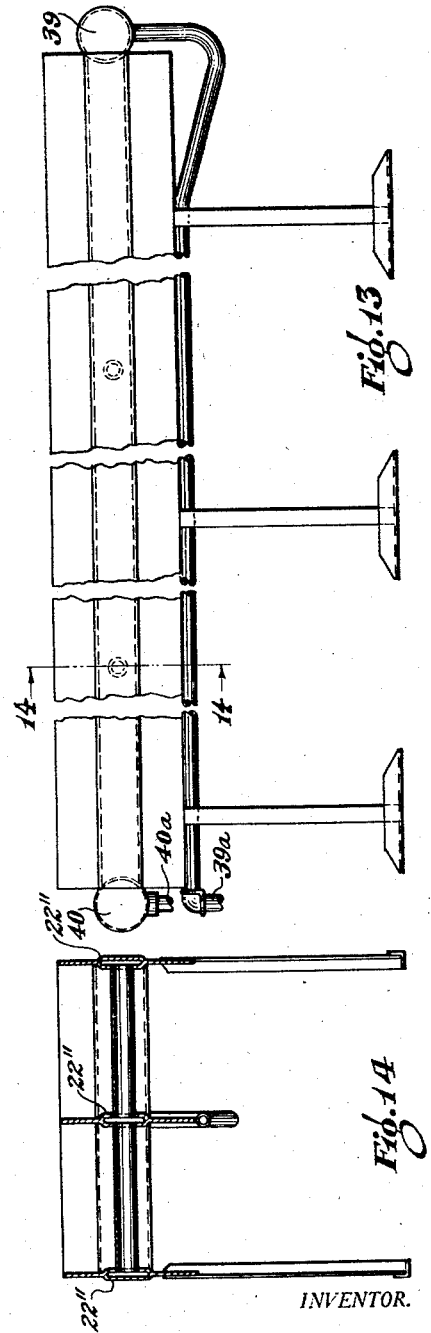

Patented Aug. 7, 1934

1,968,813

UNITED STATES PATENT OFFICE 1,968,813

APPARATUS FOR STORING AND DISPENSING PRODUCTS

Michael H. Ackerman, Mansfield, Ohio

Application January 3, 1933, Serial No. 649,888

13 Claims. (Cl. 62—126)

This invention relates to an improved refrigerated apparatus for storing products or materials to be consumed and in which dispensing of such materials and various other edibles is greatly facilitated.

It has been the prevailing practice to retail frozen materials, such as ice cream and ices, from cabinets refrigerated with direct expansion evaporator coils submerged in asphalt, cement or brine in order to increase the heat conductivity of the coils. This method of refrigeration has serious objections for the reason that approximately nine-tenths of the refrigeration produced is conducted to the bottom of the storing chamber, where, according to the laws of heat and cold, the refrigeration is trapped and absorbed by the materials in storage. Under such conditions the materials in the bottoms of the containers are frozen too hard to dispense, while the materials at the tops of the containers lack refrigeration and therefore are too soft to dispense.

Where storing and dispensing cabinets are constructed to use a flooded type of evaporator submerged in brine, the evaporator is positioned to induce a thermal circulation of the brine. The refrigerated brine therefore flows to the bottom of the brine holding tank, so that the cooling effect is pronounced and over-done about the bottoms of the containers while there is a lack of refrigeration about the container tops.

Where frozen materials are held for long periods during cold weather, it has been found that the alternate warming and freezing of the materials at the top portions of the containers sets up a molecular activity, which tends to separate the water content from the butter fat and other ingredients of the materials with the result that the materials become grainy or icy. To prevent spoilage under the conditions above mentioned, it has become customary for the maker of the frozen materials, when filling the storing cans to fill them approximately four-fifths of their capacity.

With the foregoing objections in mind, one object of the present invention is to provide a refrigerated apparatus for storing and dispensing frozen materials with the maximum refrigeration effect about the tops of the containers, using a flooded evaporator constructed to refrigerate the storing chamber and to bring the refrigerant into intimate and direct contact with the materials to be refrigerated, using the conductivity of the metal lining for the casing and walls of the material containers to conduct the refrigeration downward, thereby eliminating the use of asphalt, cement or brine for this purpose.

Another object of the invention is to provide a positive and uniform distribution of the refrigerating effect and the production of a strata of cold air above the ice cream container tops sufficiently effective to permit the apparatus to be operated and used with all lids of the containers removed for display and to facilitate customer service or dispensing during rush hours.

Another object of the invention is to provide a frozen material dispensing cabinet which will display the entire stock or flavors of materials on sale and the sanitary conditions under which sale may be effected.

Another object of the invention is to provide an improved combined display counter and storing apparatus in which provision is made for displaying goods and dispensing the same and the frozen materials without obstructing their vision and for conveniently storing cleaning clothes and dispensing utensils out of sight of the purchasers.

Another object of the invention is to provide a casing having a recess extending along its rear side adjacent the floor, permitting the toes of the clerk to extend under the casing, thereby shortening the reach or effort required to dip and serve the ice cream and other materials.

Another object of the invention is to provide improved closure means for the casing comprising a plurality of removable lids slidable on the casing and unattached to each other whereby upon the removal of one or more lids, the remaining lids may be slid singly or in groups to open a small or large portion of the casing or separated portions thereof simultaneously.

Another object of the invention is to provide an improved apparatus of this character in which a volatile liquid refrigerant is contained in a plurality of evaporator members which are related to the tops of the material containers and through contact of the evaporator members with the side walls of the storing chamber and refrigeration of the contained atmosphere, effect adequate and economical refrigeration of the stored materials.

Another object of the invention is to provide an apparatus of this character which may be readily and economically fabricated of any desired length and width and cheaply operated to refrigerate the materials in a large number of containers.

Another object of the invention is to provide an improved refrigerated apparatus adapted to receive standard sized containers filled with frozen materials and to maintain such materials at a suitable dispensing temperature, the refrigerating means being constructed so as to occupy minimum space within the apparatus, thereby providing large storing space for other materials around or between the containers.

Other objects of the invention will be apparent to those skilled in the art to which my invention relates from the following description taken in connection with the accompanying drawings, wherein Figs. 1 and 1a together constitute a view, partly in plan, partly in section and with parts omitted, of an apparatus embodying my invention.

Figs. 2 and 2a together constitute a front view, partly in section and parts broken away.

Fig. 4 is a cross sectional view, in perspective, of the apparatus.

Fig. 5 is a side view of the frame.

Fig. 6 is a plan view of the frame.

Fig. 8 is a plan view of the refrigerating means.

Fig. 9 is a side view of parts shown in Fig. 8.

Fig. 10 is an end elevation of parts shown in Figs. 8 and 9.

Fig. 11 is a section, enlarged, on the line 11—11 of Figs. 8 and 9.

Fig. 12 is a fragmentary section on the line 12—12 of Fig. 8.

Fig. 13 is a side view of a refrigerating means of another embodiment.

Fig. 14 is a section on the line 14—14 of Fig. 13.

Fig. 15 is a fragmentary view of a circulation member such as shown in Figs. 13 and 14.

Fig. 16 is a fragmentary view of a modified form of circulation member.

The apparatus comprises a casing indicated as an entirety at 1 and a frame, indicated as an entirety at 2, mounted on and rigidly secured to the walls of the casing 1. The purpose of the frame 2 will be later set forth.

Figure 7:
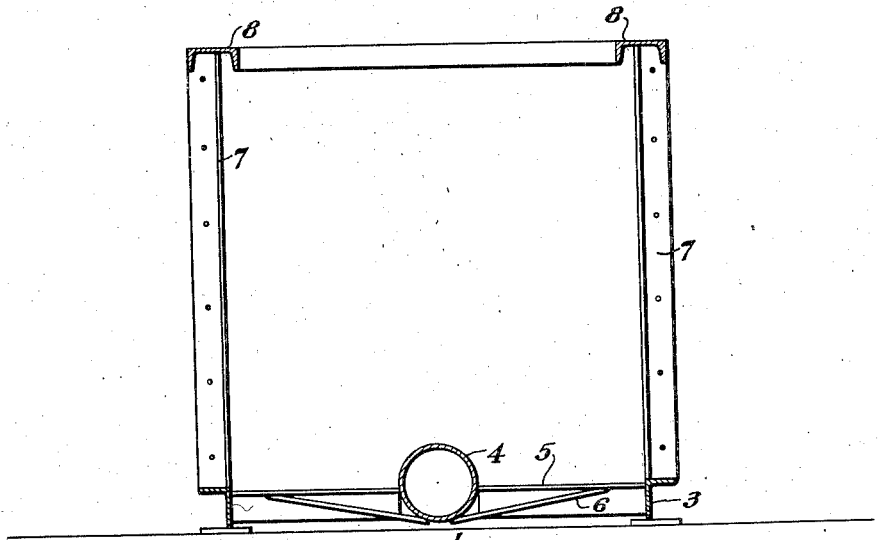
Fig. 7 is a section on the line 7—7 of Fig. 5.

The casing 1 herein shown is approximately 20 feet long and capable of receiving two longitudinal rows of containers A preferably of standard shape, each adapted to hold 5 gallons of material. The casing 1 includes a skeleton frame structure as follows:

3 indicates a pair of spaced angle bars extending from end to end of the casing (Figure 5). It will be noted that one wall of each bar extends vertically and the other wall thereof extends horizontally outwardly, its outer edge being alined with the lower edge of the rear facing wall 9. This arrangement permits the operator or dispenser to position his or her feet under the casing thus facilitating access to the containers A. 4 indicates a reinforcing member preferably comprising a pipe extending from end to end of the casing and disposed centrally between the bars 3. 5 indicates transverse angle bars connecting the reinforcing member 4 and bars 3 and braced by members 6. 7 indicates a plurality of upright angle bars mounted on the bars 3. 8 indicates a pair of channel bars disposed in an inverted position and mounted on the upper ends of the uprights 7 along the sides and ends of the structure. The parts just referred to may be connected by welding or other suitable means. As will be understood from Figure 7, the outer edge portions of the uprights 7, adjacent their upper ends are cut away to receive the adjacent or outer flanges of the channel bars 8, so that the outer sides thereof may be flush with the longitudinal edges of the uprights to receive the front and rear walls 9, which are nailed or screwed to wood strips 9' (see Fig. 4). 10 indicates a suitable flooring resting on the bars 5.

The inner walls of the casing comprise sides 11, ends 12 and a bottom 13, formed of sheet metal sections suitably seamed, by soldering or welding, to form a substantially liquid and air or gas tight storing chamber or compartment for the containers A. The sheet metal may be formed of sheet steel or stainless sheet steel, or aluminum alloy, but preferably a non-corrosive material having high heat conductivity.

As shown in Figures 1, 2, 3 and 4, the sides 11, ends 12 and bottom 13 are spaced from the walls 9 and flooring 10 to accommodate a suitable non-heat conducting material 14, such as hair, felt, cork and the like.

15, 15a, indicate top rails or bars extending along the sides of the casing and related to end rails or bars 16. These rails or bars are preferably formed of wood and are rigidly (but removably) mounted in any suitable manner on the channel bars 8 and upper ends of the sides 11 and ends 12 and serve to close the space for the insulating material 14. Each rail is of such width that its lateral sides extend beyond the walls 9 and 11.

The inner and outer sides and top of each rail 15, 15a, 16, are sheathed with suitable sheet metal preferably of a character (or having a finish) which provides a neat appearance without danger of corroding. The inner opposing sides of the rails 15, 15a, form guides for a series of covers 17 which are individually removable and also slidable on the rails longitudinally thereof. The covers 17 are of uniform size and each may be formed of wood and preferably sheathed with suitable non-corrosive sheet metal 18. The sheet metal along the opposite ends of each cover is extended, as shown at 18a, to form a flange that engages the tops of the rails 15, 15a. The covers 17 serve to close the storing chamber for the containers at night and during those hours of the day when no dispensing is taking place.

When dispensing of the materials is required, one or more covers are moved and then one or more of the remaining covers may be moved on the rails 15, 15a, if necessary, to permit access to the desired container. By preference, several covers are removed, as shown in Figure 1a, when dispensing is to take place or during busy hours, the purpose being to expose to view of the customer several differently flavored materials, so that the customer can make a satisfying selection as well as become better informed on the varviety of flavors available. The handles 19 on the covers 17 are preferably countersunk to eliminate projections above the top surfaces thereof, as well as to permit them, when removed, to be set in piles.

The bottom 13 of the storing chamber is preferably provided with guides or spacers for the lower ends of the containers A, so that when each thereof is lowered into the chamber it may be properly positioned with respect to the sides 11 and portions of the refrigerating means, indicated as an entirety at 20, to be later described. The guides or spacers comprise wooden strips 21, one being disposed on the bottom 13 in and extending along each corner and one being disposed on the bottom 13, midway between the sides 11. The storing chamber is of such width that the strips 21, when positioned in this manner, are spaced sufficiently to readily receive between them the lower ends of the containers and portions of the refrigerating means which are disposed at the opposite sides of the containers, as later set forth.

The refrigerating means 20 comprises a plurality of circulation members 22 for a liquid refrigerant having a relatively low boiling point, such as liquid ammonia. The circulation members 22 are of a shape which permits them to be positioned longitudinally in the spaces between the rows of containers and between the latter and the sides 11 and to extend vertically from a plane above the open ends of the containers to a point approximately 8 inches below such ends.

By preference, the container storing chamber is of such width that the outer circulation members 22 are in contact with the side walls 11 and these members and the inner member 22 engage the container side walls (or the cover engaging bead thereon), so that these walls may serve as heat conductors to refrigerate that portion of the materials in the containers below the circulation members. Referring to Figures 1, 1a, 3, 4, 8 to 12, inclusive, each circulation member 22 comprises a horizontally disposed conduit extending from end to end of the refrigerating chamber and elongated vertically to permit its mounting in one of the spaces referred to and at the same time provide for heat transfer above the containers A. The members 22 are rigidly connected in spaced relation by manifolds 23, 24, arranged at their respective, corresponding ends and by intermediate piping 25, 26, which permits the refrigerant to flow from one member 22 to the other members 22 to insure equalization of levels therein should the quantity of liquid in one member become reduced due to generation of gas or vapor therein.

Figure 3:
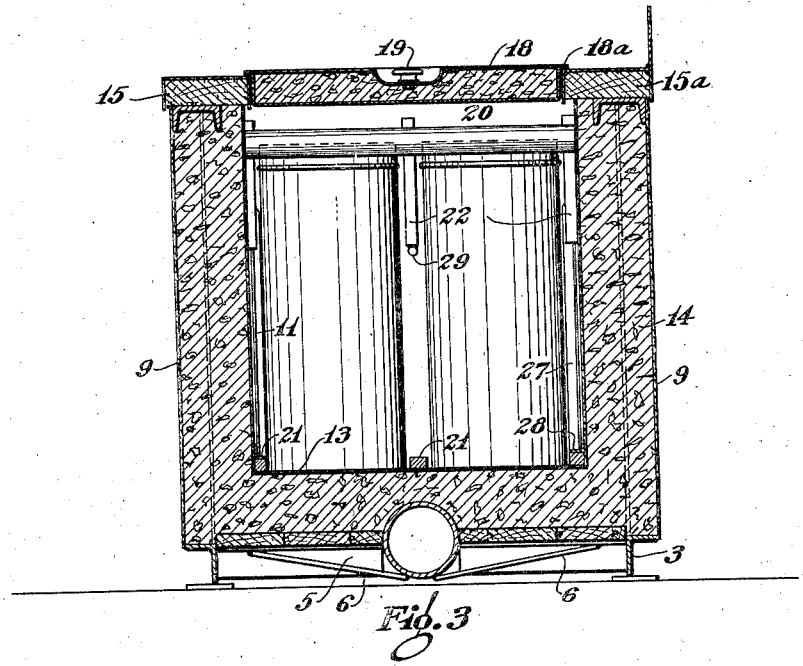
Fig. 3 is a section on the line 3—3 of Figs. 1 and 2.

The manifolds 23, 24, and piping 25, 26, connect the members 22 together so that the refrigerating means or circulation system 20 may be handled as a unitary structure and removably mounted within the casing 1, preferably on a plurality of legs or uprights 27. The upper ends of the legs 27 are cut away, as shown in Figures 3, 4 and 10, to form shoulders on which the outer members 22 rest. The legs are preferably welded to the walls of these members 22. The lower ends of the legs 27 are provided with feet 28, adapted to rest on the guide strips 21. The refrigerant is supplied by a pipe 29 to the manifold 23, the pipe leading from a suitable source of supply (not shown) and discharged into the manifold 24, to which are connected one or more discharge pipes 30. The upper ends of the end walls at the left end of the members 22 (as viewed in Figure 9) are formed with openings 31 and the manifold 24 is cut away to receive the adjacent end portions of the members, as shown in Figure 12, so that the liquid refrigerant or vapor or both may flow into the manifold. The supply manifold 23 is similarly constructed and connected to the opposite end walls of the members 22, except that the connection is made to the lower ends of these end walls.

It will be understood that the liquid refrigerant may be caused to circulate through the members 22 and out through the manifold 24, in which arrangement the resulting vapors will be carried along with the discharged liquid, or a predetermined quantity of liquid may be maintained in the members 22 by a float operated, valved supply mechanism, in which event the pipes 30 will be connected to the suction side of a suitable compressor.

Each member 22 is formed of two plates 22a spaced by a section of wire or rods extending along its sides and ends walls 22b, the wire or rods and marginal portions of the plates being preferably secured together in a liquid and gas tight manner by welding, as shown at 22b. In this arrangement the plates 22a form an elongated liquid holding space, but as the plates are relatively wide vertically and extend from end to end of the chamber within the casing 1, ample volume of refrigerating medium is provided for. The intermediate portions of the plates 22a are preferably held in spaced relation by pins 32 which extend through alined openings 32a in the plates 22a. The outer faces of the plates 22a are recessed around the openings 32a to receive the soldering or welding material 33 used to secure the pins in position and seal the openings, whereby such material may be flush with the outer surfaces of the plates. The plates 22 may be formed of a material having high heat conductivity.

In Figs. 13, 14 and 15 I show another form of refrigerating means, in which each circulation member, indicated at 22'', consists of a member, having an elongated tube and upper and lower webs, which lends itself to manufacture by any well known extruding process. As shown, the tube is elongated vertically and the webs extend in the plane of the major axis of the tube, thereby permitting the members to be positioned similarly to the members 22, and related to the upper ends of the containers A.

In Fig. 16 I show another form of circulation member 22x having a plurality of conduits. Each element 22x when extruded is formed with intermediate transverse walls 36; thereafter, by suitable tools the top wall 37 and intermediate walls 36 are bored to form openings 36a, 37a, the former being plugged as shown at 38 and the latter forming liquid connections between the conduits formed in the element 22'' by the walls 36, 37 and bottom wall. The member 22x is preferably formed by any well known extruding process.

The members 22'' and 22x may be formed of a material (such as aluminum or aluminum alloy) having high heat conductivity.

Each circulation member 22'' is connected at its opposite ends to manifolds 39, 40, to which are connected supply and discharge pipes 39a, 40a, respectively.

It will be noted that in my construction the circulation members for the refrigerant are arranged at the sides of and adjacent the upper ends of the containers A, and extend above such ends. In this arrangement the refrigerating or heat transfer means are arranged in position to counteract in-flow of warm air when one or more containers are exposed by the closure devices 17. Also, such arrangement produces a refrigerated atmosphere above the upper ends of the containers so that the latter need not be (and by preference are not) provided with individual lids or covers. In this connection, it will be seen that the covers 17 form with the side walls 11 a substantially closed chamber. As the circulation members extend above the open ends of the containers A, they provide a strata of refrigerated atmosphere thereabove, so that as many covers as desired may be removed. Also, this arrangement permits the containers to be completely filled before they are positioned in the receiving chamber of the casing.

In my arrangement of refrigerating means I have found that adequate refrigerating effect, due to convection currents of the atmosphere within the receiving chamber and conduction of heat through the walls of the containers A and side walls 11 to maintain the entire mass of material in each container at a desirable temperature and viscosity, which permits ready dispensing and consumption and that such condition of the material is maintained until the container is entirely emptied or dispensed. It will therefore be seen that the refrigerating means is arranged at that point (a) where the material in each container is directly exposed to outside atmosphere, when access to the container takes place, and (b) where the normal tendency of cold air currents to descend may be advantageously applied to refrigerate the materials in the containers below the refrigerating means. This arrangement produces a number of advantages; for example, it permits the direct application of the refrigerant to maintain the stored materials at the desired temperature, instead of by indirect application by means of brine or other refrigerated medium; it eliminates the necessity for tanks for brine and receivers in the tanks for the containers and permits the casing 1 to be relatively light and easily constructed; it leaves a large area in the receiving chamber around the containers for the storage of other materials to be consumed; it enables the containers to be readily inserted in and removed from the casing; it enables the entire space within the casing to be utilized for containers; it simplifies the construction of the refrigerating means and assembly thereof; and it requires merely two liquid connections to and from the casing.

The frame 2 is incorporated with the casing 1 in any desirable manner so as to overhang and be disposed above the outer sill 15a. By preference, the front wall 9 of the casing is faced with a wall or panels 9a having an attractive finish, such walls being secured to supports 41. The supports 41 are connected to the casing in any desired manner and are preferably utilized to support the frame 2 above the sill 15a. The frame 2 comprises a lower horizontal member 42, a front vertical panel 43 disposed in the plane of the front edge of the member 42 and an upper horizontal member 44. A bracket 45 supports the panel 43 and upper support 44. The lower support 42 is formed of opaque material, preferably wood, and covers the sills 15a, whereby cloths and utensils, out of sight of persons in front of the apparatus, may be placed; whereas the front panel 43 and upper support 44 are made of transparent material, whereby edibles may be displayed on the lower horizontal member and view of the containers A are not obstructed. A back 46 may be provided for the sill 15a. It will be understood that the frame 2 may extend from end to end of the casing 1.

To those skilled in the art to which my invention relates, many changes in construction and widely differing embodiments and applications of the invention will suggest themselves without departing from the spirit and scope thereof. My disclosures herein are purely illustrative and are not intended to be in any sense limiting.

What I claim is:

1. In apparatus of the class described, the combination of an enlongated casing having insulated bottom, side and end walls forming a chamber open at its upper end and adapted to enclose a row of containers filled with materials to be maintained in a refrigerated condition and dispensed, a horizontally arranged evaporator having a length substantially co-extensive with said chamber and shaped to form in cross section a relatively narrow, vertically elongated cavity for holding a volatile refrigerant, said evaporator being spaced above the bottom of said chamber and disposed at one side of the container row with its upper portion extending above the upper ends of the containers to provide a deep strata of refrigerated air thereabove, means for maintaining the evaporator partially filled with the volatile liquid refrigerant, whereby separation of gas from the liquid due to absorption of heat is provided for, and an outlet for gas leading from said evaporator.

2. In apparatus of the class described, the combination of an elongated casing having insulated bottom, side and end walls forming a chamber open at its upper end and adapted to enclose rows of containers filled with materials to be maintained in a refrigerated condition and dispensed, horizontally arranged evaporators disposed between and along the outer sides of said container rows, respectively, and extending relatively thereto substantially from end to end of said chamber, each said evaporator being shaped to form in cross-section a relatively narrow, vertically elongated cavity for holding a volatile liquid refrigerant, said evaporators being spaced above the bottom of said chamber and disposed with their upper portions extending above the upper ends of the containers to provide a deep strata of refrigerated air thereabove, means for maintaining the evaporators partially filled with the volatile liquid refrigerant, whereby separation of gas from the liquid due to absorption of heat is provided for, and outlet means for gas leading from the evaporators.

3. In apparatus of the class described, the combination of an elongated casing having insulated bottom, side and end walls forming a chamber open at its upper end and adapted to enclose rows of containers filled with materials to be maintained in a refrigerated condition and dispensed, horizontally arranged refrigerating elements disposed between and along the outer sides of said container rows, respectively, and extending relatively thereto substantially from end to end of said chamber, each said element being shaped to form in cross section a relatively narrow, vertically elongated cavity for holding a volatile liquid refrigerant, said elements being spaced above the bottom of said chamber and disposed with their upper portions extending above the upper ends of the containers to provide a deep strata of refrigerated air thereabove, means for maintaining the elements partially filled to a predetermined uniform level with the volatile liquid refrigerant, whereby that portion of the elements below the liquid refrigerant level serves as an evaporator and that portion of the elements above the liquid refrigerant level serves as a gas separator, and outlet means for the gas.

4. In apparatus of the class described, the combination of an elongated casing having insulated bottom, side and end walls forming a chamber open at its upper end and adapted to enclose two rows of containers filled with materials to be maintained in a refrigerated condition and dispensed, an evaporator comprising hollow members extending along the opposite outer sides of the container rows and a hollow member extending between the container rows, each of said members in cross section being relatively narrow and vertically elongated and disposed horizontally in a plane above the bottom of said chamber with the upper portion of said members extending above the upper ends of the containers, connections between said members, and means for maintaining a supply of volatile liquid refrigerant in said members.

5. In apparatus of the class described, the combination of an elongated casing having a bottom and insulated side and end walls forming a chamber open at its upper end and adapted to enclose a row of containers filled with material to be maintained in a refrigerated condition, an evaporator comprising a hollow member extending along one side of the container row, said member in cross section being relatively narrow and vertically elongated and disposed horizontally in a plane above the bottom of said chamber with the upper portion of said member extending above the upper ends of the containers, the side walls of said member having parallel plane outer surfaces, and means for maintaining a supply of volatile liquid refrigerant in said member.

6. In apparatus of the class described, the combination of an elongated casing having a bottom and insulated side and end walls forming a chamber open at its upper end and adapted to enclose a row of containers filled with materials to be maintained in a refrigerated condition and dispensed, a horizontally arranged evaporator having a length substantially co-extensive with said chamber and shaped to provide a relatively narrow, vertically elongated element having transverse division walls forming a vertical series of longitudinal cavities, said division walls being formed with spaced openings arranged to connect the adjacent cavities, said evaporator being spaced above the bottom of said chamber and disposed at one side of the container row with its upper portion extending above the upper ends of the containers to provide a deep strata of refrigerated air thereabove, means for maintaining the evaporator partially filled with the volatile liquid refrigerant, whereby separation of gas from the liquid due to absorption of heat is provided for, and an outlet for gas leading from the evaporator.

7. In apparatus of the class described, the combination of an elongated casing having insulated bottom, side and end walls forming a chamber open at its upper end and adapted to enclose a row of containers filled with materials to be maintained in a refrigerated condition and dispensed, a horizontally arranged evaporator substantially co-extensive in length to said chamber and having walls shaped to form in cross section a relatively narrow, vertically elongated cavity for holding a volatile liquid refrigerant and a vertically extending heat conducting member, said evaporator being spaced above the bottom of said chamber and disposed at one side of the container row with its upper portion extending above the upper ends of the containers to provide a deep strata of refrigerated air thereabove, means for maintaining the evaporator partially filled with the volatile liquid refrigerant, whereby separation of gas from the liquid due to absorption of heat is provided for, and an outlet for gas leading from the evaporator.

8. An evaporator comprising a plurality of spaced parallel members extending horizontally and each comprising walls shaped to provide in cross section a relatively narrow, vertically elongated cavity extending longitudinally throughout its length and adapted to be partially filled with a volatile liquid refrigerant, liquid refrigerant connections between the lower portions of said members, and gas connections between the upper portions of said members.

9. An evaporator comprising a plurality of spaced parallel members adapted to be supported horizontally and each comprising walls shaped to provide in cross section a relatively narrow, vertically elongated element having transverse division walls forming a vertical series of longitudinally extending cavities, said division walls being formed with spaced openings arranged to connect adjacent cavities.

10. An evaporator member comprising a body portion having walls shaped to form in cross section a relatively narrow, vertically elongated cavity extending from end to end of said member and webs extending vertically in the plane of said body portion along its upper and lower ends and integrally connected to the walls of said portion.

11. In apparatus of the class described, the combination of an elongated casing having insulated bottom, side and end walls forming a chamber open at its upper end and adapted to enclose a row of containers filled with materials to be maintained in a refrigerated condition and dispensed, said side walls being provided along their upper ends with ways, a horizontally arranged evaporator substantially co-extensive with said chamber, said evaporator being spaced above the bottom of said chamber and disposed at one side of the container row with its upper portion extending above the upper ends of the containers to provide a deep strata of refrigerated air thereabove, means for maintaining in the evaporator a supply of volatile liquid refrigerant, an outlet for gas leading from the evaporator, and a plurality of separable lids each slidable from end to end of said ways and each removable independently of the remaining lids.

12. An evaporator comprising a plurality of spaced parallel, relatively long members extending horizontally and in upright position and having hollow portions extending from end to end thereof and adapted to contain a volatile liquid refrigerant, each said member being elongated vertically and its opposite outer side walls being plane throughout their areas, liquid connections between the lower portions of said members, a supply connection at one end of said members for the refrigerant, and an outlet connection at the other end of said members for generated gases.

13. The combination with a casing adapted to receive receptacles filled with materials to be dispensed in substantially frozen condition, of a relatively long refrigerating member extending horizontally and in upright position within said casing and having hollow portions extending from end to end of said member and adapted to contain a refrigerant, said member being elongated vertically and its opposite outer side walls being plane throughout their areas, a supply connection at one end of said member for the refrigerant, and an outlet connection at one end of said member.

MICHAEL H. ACKERMAN.